(12) United States Patent
Schaumann

(10) Patent No.: US 9,573,615 B2
(45) Date of Patent: Feb. 21, 2017

(54) RACK-AND-PINION STEERING

(75) Inventor: Lothar Schaumann, Ratingen (DE)

(73) Assignee: TRW AUTOMOTIVE GMBH, Alfdorf (DE)

(*) Notice: Subject to any disclaimer, the term of this patent is extended or adjusted under 35 U.S.C. 154(b) by 379 days.

(21) Appl. No.: 13/318,554

(22) PCT Filed: May 3, 2010

(86) PCT No.: PCT/EP2010/002687
§ 371 (c)(1),
(2), (4) Date: Jan. 18, 2012

(87) PCT Pub. No.: WO2010/127816
PCT Pub. Date: Nov. 11, 2010

(65) Prior Publication Data
US 2012/0111132 A1    May 10, 2012

(30) Foreign Application Priority Data
May 4, 2009  (DE) ................ 10 2009 019 890

(51) Int. Cl.
*F16H 19/04*  (2006.01)
*B62D 3/12*  (2006.01)

(52) U.S. Cl.
CPC ............ *B62D 3/12* (2013.01); *Y10T 74/18088* (2015.01)

(58) Field of Classification Search
CPC .................... B62D 3/12; B62D 7/22–7/228
USPC .......... 74/89.19, 388 PS, 422; 180/427, 428, 180/444; 280/93.514, 89, 89.12
See application file for complete search history.

(56) References Cited

U.S. PATENT DOCUMENTS

| | | | | |
|---|---|---|---|---|
| 4,218,933 A | * | 8/1980 | Allen et al. ...................... 74/422 |
| 4,721,175 A | * | 1/1988 | Butler ............................ 180/428 |
| 5,421,591 A | * | 6/1995 | Katzensteiner ................ 277/550 |
| 5,694,810 A | * | 12/1997 | Iwasa et al. ..................... 74/422 |
| 5,855,375 A | * | 1/1999 | Wilcox et al. ................. 277/551 |
| 6,044,723 A | * | 4/2000 | Eda ....................... B62D 5/0409 |
| | | | | 180/443 |

(Continued)

FOREIGN PATENT DOCUMENTS

CN    1587941 A    3/2005
DE    1922799 U    9/1965

(Continued)

OTHER PUBLICATIONS

Search Report for DE10 2009 019890.3 dated Feb. 22, 2010.

(Continued)

*Primary Examiner* — David M Fenstermacher
(74) *Attorney, Agent, or Firm* — MacMillan, Sobanski & Todd, LLC

(57) ABSTRACT

The invention relates to a rack-and-pinion steering, including a toothed rack having a longitudinal axis, a toothed rack housing in which the toothed rack is guided for axial displacement between two end stops, and an end stop damping assembly which includes at least one stop ring and at least one elastic compression body, the compression body surrounding the toothed rack, and its spring/damping section having an axial length in a non-loaded condition. The stop ring has a continuously surrounding axial guide extension which is located radially inside in relation to the compression body and which has an axial length that is smaller than the axial length of the spring/damping section of the compression body.

11 Claims, 3 Drawing Sheets

(56) References Cited

U.S. PATENT DOCUMENTS

| | | | | |
|---|---|---|---|---|
| 6,089,589 | A * | 7/2000 | Miyazaki | B62D 3/12 280/428 |
| 6,155,375 | A * | 12/2000 | Gierc et al. | 180/428 |
| 6,467,567 | B2 * | 10/2002 | Kobayashi | B62D 5/00 180/428 |
| 6,598,697 | B2 * | 7/2003 | Oishi | 180/428 |
| 7,258,035 | B2 | 8/2007 | Bieber | |
| 7,275,618 | B2 * | 10/2007 | Abe | B62D 3/12 180/443 |
| 7,401,789 | B2 * | 7/2008 | Harer et al. | 277/585 |
| 7,461,571 | B2 * | 12/2008 | Tanaka | 74/388 PS |
| 7,828,110 | B2 * | 11/2010 | Shao et al. | 180/428 |
| 8,544,850 | B2 * | 10/2013 | Balsells et al. | 277/551 |
| 2006/0131828 | A1 | 6/2006 | Tanaka | |
| 2010/0059937 | A1 * | 3/2010 | Castleman et al. | 277/309 |

FOREIGN PATENT DOCUMENTS

| | | | | |
|---|---|---|---|---|
| DE | EP 1777138 | A1 * | 4/2007 | B62D 3/12 |
| EP | 1777138 | A1 | 4/2007 | |
| JP | 669061 | U | 9/1994 | |
| JP | 11078914 | A | 3/1999 | |
| JP | 2004232714 | A | 8/2004 | |
| JP | 2005088777 | A | 4/2005 | |
| JP | 2011078914 | A | 4/2011 | |
| WO | 03029067 | A1 | 4/2003 | |
| WO | 2005028284 | A1 | 3/2005 | |

OTHER PUBLICATIONS

International Search Report for PCT/EP2010/002687 dated Jul. 13, 2010.
Search Report from State Intellectual Property Office of the People's Republic of China for Application No. 201080026520.X dated May 31, 2013.
Korean Office Action, Application No. 10-2011-7028980, dated Mar. 2, 2016.
Chinese Notification of Third Office Action, Application No. CN 201080026520.X, dated Aug. 2, 2016.

* cited by examiner

RACK-AND-PINION STEERING

CROSS-REFERENCE TO RELATED APPLICATIONS

This application is a national stage of International Application No. PCT/EP2010/002687 filed May 3, 2010, the disclosures of which are incorporated herein by reference in entirety, and which claimed priority to German Patent Application No. 10 2009 019 890.3 filed May 4, 2009, the disclosures of which are incorporated herein by reference in entirety.

BACKGROUND OF THE INVENTION

The invention relates to a rack-and-pinion steering for vehicles, including a toothed rack having a longitudinal axis, a toothed rack housing in which the toothed rack is guided for axial displacement between two end stops, and an end stop damping assembly which includes at least one stop ring and at least one elastic compression body, the compression body surrounding the toothed rack, and its spring/damping section having an axial length in a non-loaded condition. The stop ring has a continuously surrounding axial guide extension which is located radially inside in relation to the compression body and which has an axial length.

Such a rack-and-pinion steering having the features of the generic portion of claim 1 is known from WO 03/029067 A1, and corresponding U.S. Pat. No. 7,258,035 B2, both of which are incorporated by reference herein in entirety, for example. The end stop damping assembly here includes two bushings that are angled to form flanges and an elastically flexible material, the bushings that are fitted into one another and the flanges thereof forming an approximately hollow cylindrical chamber which fully encloses the elastically flexible material. While one of the bushings is firmly installed in a housing, the other can be moved axially in relation to a toothed rack axis, whereby the elastically flexible material is compressed in the region of an end stop and the end stop is struck in a damped manner. In a variant embodiment of the steering, the bushing that is firmly installed in the housing may also be integrated in one piece in the housing.

In the end stop damping of rack-and-pinion steering systems it is, in principle, desirable for the damping assembly to be structured as simply as possible and to allow to be mounted with minimum effort while requiring a small amount of structural space. In addition, it is of particular importance that the damping assembly with the elastic compression body has a suitable damping or spring characteristic.

In WO 03/029067 A1 the end stop damping assembly features a very steep characteristic. This makes the end stop fairly hard, which leads to high stress on the component and may also cause damage to the rack-and-pinion steering over the long service life.

EP 1 777 138 A1, in contrast, discloses an end stop damping assembly for a rack-and-pinion steering in which elastic compression bodies are connected in series. From this series connection and the almost unlimited possibilities of deformation of the compression bodies there results a very flat characteristic, i.e. a fairly soft end stop. Accordingly, a large deformation path is required in order to provide a sufficient counterforce for braking the toothed rack. The damping assembly therefore takes up an undesirably large amount of structural space and, due to the series connection of the compression bodies with stabilization members interposed, further leads to considerable manufacturing expenditure.

BRIEF SUMMARY OF THE INVENTION

A feature of the invention is to provide a rack-and-pinion steering having an end stop damping assembly that has a simple structure and can be mounted with little effort and, furthermore, provides good possibilities of setting a desired damping or spring characteristic.

This feature is achieved by a rack-and-pinion steering of the type mentioned at the outset, in which the axial length of the guide extension is smaller than the axial length of the spring/damping section of the compression body. Compared to a compression body that is completely encapsulated in the end stop damping assembly, this results in the compression body having greater freedom of deformation. For example, a deformation space for the compression body can be adjusted with little effort by varying the axial length of the guide extension. The compression body includes a spring/damping section which is arranged between two contact surfaces which are associated, on the one hand, with the toothed rack housing and, on the other hand, with the toothed rack and which move axially relative to each other. The spring/damping section of the compression body has an axial length which, in contrast to that in WO 03/029067, is larger than that of the guide extension. The spring/damping section of the compression body is in the non-loaded condition when the toothed rack does not apply an external force on the spring/damping section. An installation of the compression body under a pretension may nevertheless be provided.

The above-mentioned feature is also achieved by a rack-and-pinion steering including a toothed rack having a longitudinal axis, a toothed rack housing in which the toothed rack is received for axial displacement between two end stops, an end stop damping assembly which includes at least one stop ring and at least one elastic compression body, and a guide bushing which serves to guide the displaceable toothed rack and is arranged in a recess of the toothed rack housing. The stop ring axially fixes the guide bushing in position in the toothed rack housing. Such a guide bushing for guiding the displaceable toothed rack needs to be provided in particular on the passenger's side of vehicles having a rack-and-pinion steering. In accordance with the invention, a stop ring of the end stop damping assembly is now made use of to axially fix the guide bushing in position in the toothed rack housing. Strictly speaking, the guide bushing is fixed in position in the toothed rack housing within the usual tolerances because a minimum relative movement due to manufacturing tolerances can not be entirely ruled out. This, however, will be neglected in the following. The stop ring is arranged axially offset in relation to the guide bushing and forms a stop for the guide bushing. Preferably, the stop ring, after being mounted, fixes the guide bushing in place in the axial direction and rests permanently against it. The additional function of the end stop damping assembly as a fastening means for the guide bushing simplifies the design of the toothed rack housing since any special provisions for attaching the guide bushing can be dispensed with. In addition, a particularly uncomplicated mounting of the guide bushing and the end stop damping assembly is obtained.

The end stop damping assembly is preferably attached to the toothed rack housing.

In a preferred embodiment the end stop damping assembly is accommodated in a housing opening and is seated in the toothed rack housing with an interference fit. Mounting the end stop damping assembly and fixing the guide bushing in position, if required, are possible in this case with minimum expense.

The compression body, preferably its damping section, may be a ring having a substantially trapezoidal annular cross-section. The ring shape allows a uniform surface pressure to be obtained in the circumferential direction, and the trapezoidal cross-section allows a progressive spring characteristic to be adjusted in a particularly advantageous manner.

The compression body is preferably produced from an elastomer material.

In one embodiment, the stop ring is attached to the elastic compression body by means of a form-locking connection, the form-locking connection preferably being realized as a detent or snap-on connection. This allows the individual parts of the end stop damping assembly to be fitted together with a flick of the wrist, so to speak, to form a structural unit.

In a further embodiment, the elastic compression body is vulcanized to the at least one stop ring. In this case, the manufacture of the compression body and the attachment of the compression body to the stop ring are advantageously carried out in just one production step. Of course, vulcanizing and form-locking connection may also be common attachment options.

In a particularly preferred embodiment of the rack-and-pinion steering, the end stop damping assembly includes a plurality of stop rings, one of which serves as an attachment ring for the end stop damping assembly and a further stop ring is contacted on the end face by the toothed rack or an intermediate part at least in the axial end stop.

The damping section is more particularly situated between two stop rings, so that the distance from the opposite contact surfaces thereof with the compression body defines the axial length of the damping section.

Other advantages of this invention will become apparent to those skilled in the art from the following detailed description of the preferred embodiments, when read in light of the accompanying drawings.

DETAILED DESCRIPTION OF THE INVENTION

Figure 1:
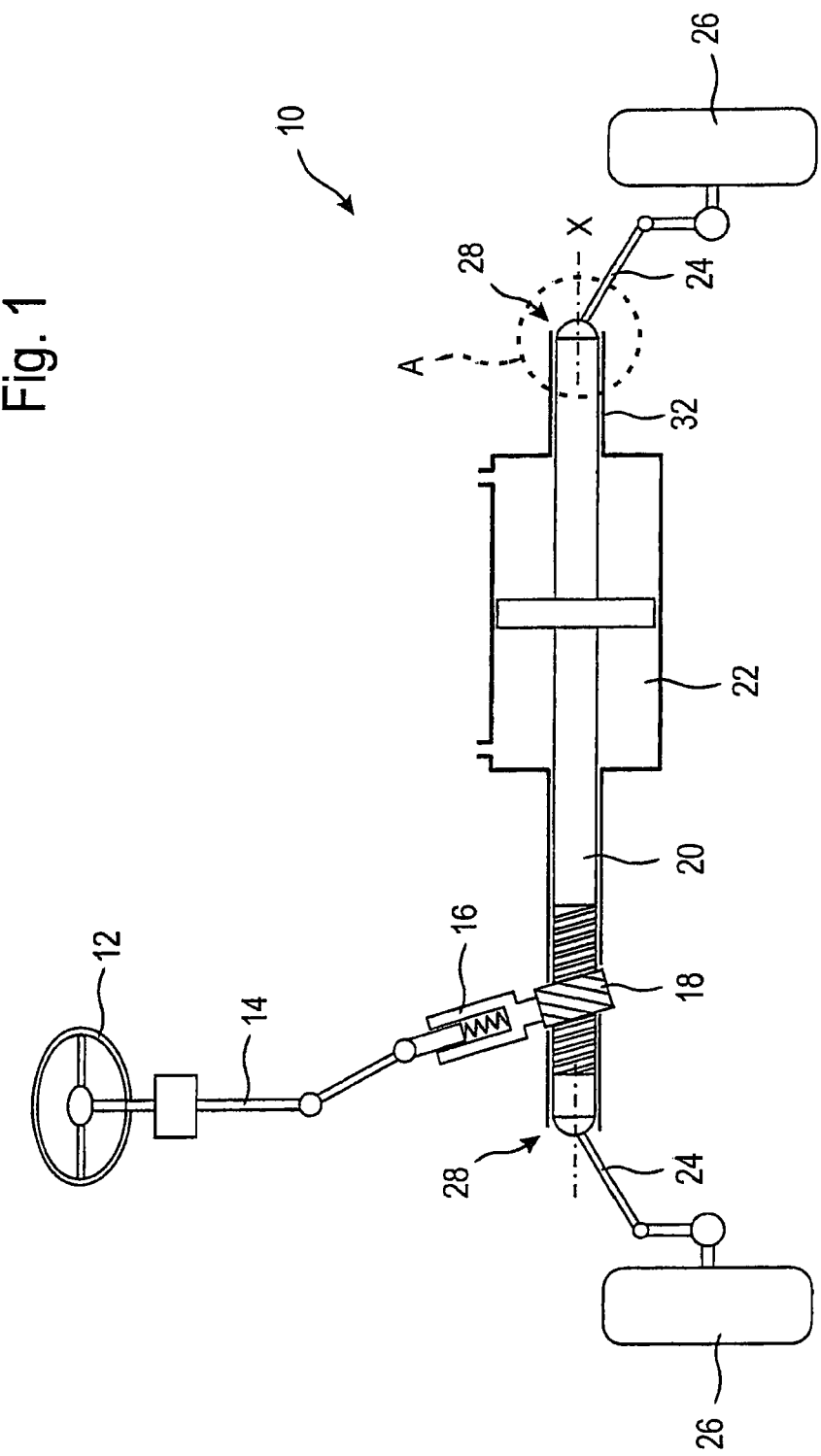
FIG. 1 shows a schematic sketch of a rack-and-pinion steering according to the invention.

FIG. 1 shows a rack-and-pinion steering 10 for vehicles. In the exemplary embodiment shown, the rack-and-pinion steering 10 is part of an electrohydraulic vehicle steering system in which a steering wheel 12 is connected to a servo valve 16 and a pinion 18 via a steering column 14. The pinion 18 meshes with a toothed rack 20, so that the latter is acted upon by a manual steering force applied to the steering wheel 12. Further provided is a hydraulic actuating cylinder 22 which is adapted to apply a hydraulic steering force to the toothed rack 20 in a known manner.

The toothed rack 20 is coupled at its axial ends to steerable wheels 26 of a vehicle by means of tie rods 24, the toothed rack 20 being connected to the tie rods 24 by a ball joint 28 each. An end stop for the toothed rack 20 is formed on a toothed rack housing 32 in a connecting area "A" between the toothed rack 20 and the tie rod 24, a maximum steering lock being defined by the end stop. In a steering movement up to the end stop, high mechanical stresses occur in the rack-and-pinion steering 10. To avoid damage to the steering, a damping is therefore usually provided in the region of the end stop.

Figure 2:
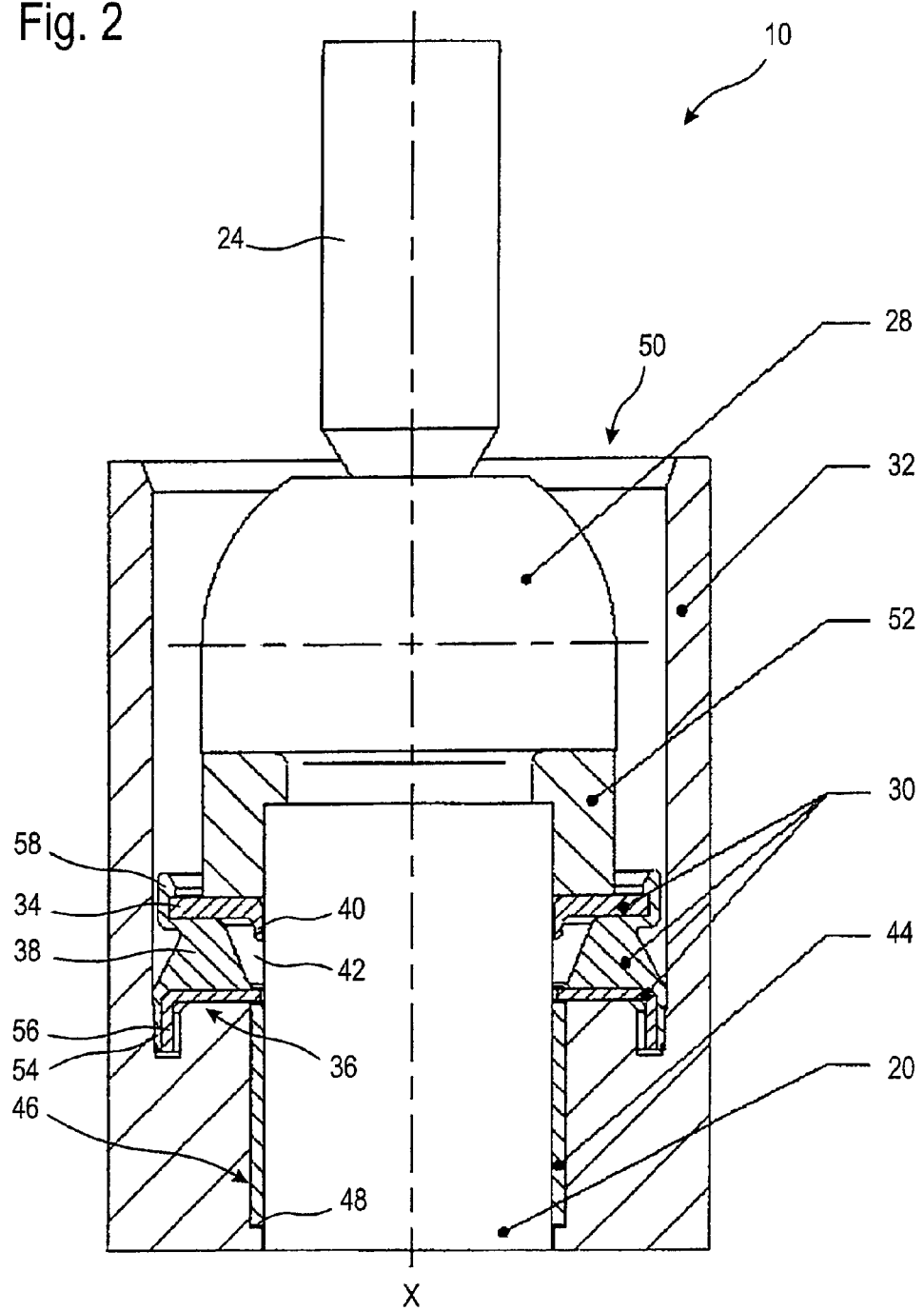
FIG. 2 shows the area "A" of the rack-and-pinion steering according to FIG. 1 in a detail section.

A particularly advantageous end stop damping assembly 30 is illustrated in FIG. 2, which shows the connecting area "A" from FIG. 1 in a detail section.

According to FIG. 2, the rack-and-pinion steering 10 comprises the toothed rack 20, which has a longitudinal axis X, a toothed rack housing 32, in which the toothed rack 20 is guided for axial displacement between two end stops, and the end stop damping assembly 30, which comprises two stop rings 34, 36 and an elastic compression body 38.

The compression body 38 surrounds the toothed rack 20. When the toothed rack 20 is not in the end stop, in this non-loaded condition the compression body 38, more precisely the spring/damping section of the compression body 38 situated between the end faces of the stop rings 34, 36 facing each other, has an axial length $x_1$ (cf. FIG. 3).

Figure 3:
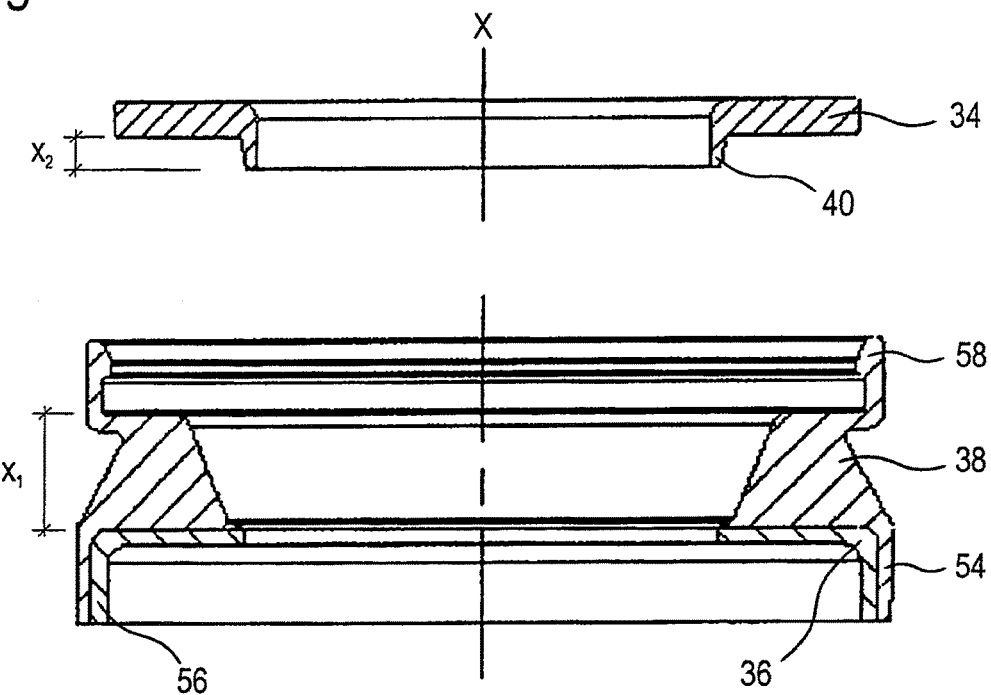
FIG. 3 shows an end stop damping assembly of a rack-and-pinion steering according to the invention prior to assembly.
Figure 4:
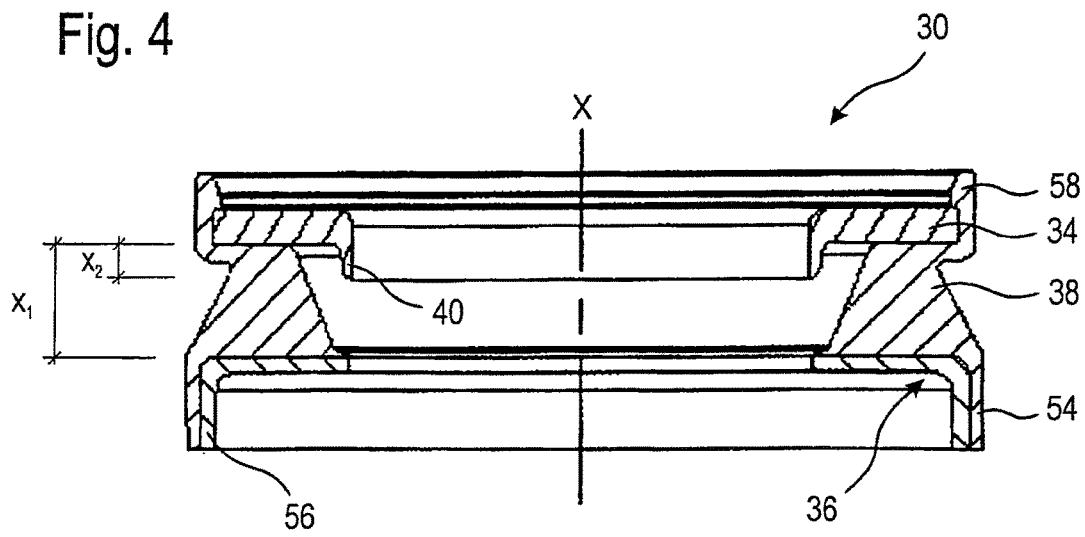
FIG. 4 shows the end stop damping assembly according to FIG. 3 after assembly.

The stop ring 34 has a continuously surrounding axial guide extension 40 which is located radially inside in relation to the compression body 38 and has an axial length $x_2$, the axial length $x_2$ of the guide extension 40 being smaller than the axial length $x_1$ of the spring/damping section (cf. also FIGS. 3 and 4).

The guide extension 40 of the stop ring 34 extends into a radial gap 42 which is defined by the two stop rings 34, 36 in the axial direction and by the compression body 38 and the toothed rack 20 in the radial direction.

Alternatively or additionally to the guide extension 40 on the stop ring 34, it is also conceivable in a variant embodiment (not shown) that an axial guide extension 40 is integrally formed with the stop ring 36, the guide extension 40 extending into the radial gap 42 between the toothed rack 20 and the compression body 38.

According to FIG. 2, the rack-and-pinion steering 10 furthermore comprises a guide bushing 44 which is arranged in a recess 46 of the toothed rack housing 32 and serves to guide the displaceable toothed rack 20, the stop ring 36 of the end stop damping assembly 30 axially fixing the guide bushing 44 in position in the toothed rack housing 32. In comparison with conventional rack-and-pinion steering systems, mounting the guide bushing 44 in the toothed rack housing 32 is thereby considerably simplified. Provision is merely to be made for a recess 46 in the toothed rack housing 32, the guide bushing 44 being inserted into the recess 46 before the end stop damping assembly 30 is mounted. This simple-to-produce recess 46 of the toothed rack housing 32 includes a shoulder 48 at an end opposite to the stop ring 36, the shoulder 48 constituting an axial stop for the guide bushing 44.

After the end stop damping assembly 30 has been mounted, that is, attached to the toothed rack housing 32, the guide bushing 44 is axially fixed in position, within the scope of usual tolerances, by the shoulder 48 of the toothed rack housing 32 and the stop ring 36 of the end stop damping assembly 30, i.e. the guide bushing 44 is held in the recess 46. To attach the end stop damping assembly 30, it is inserted into an axial housing opening 50 of the toothed rack housing 32 until it is seated in the toothed rack housing 32 with an interference fit, as illustrated in FIG. 2. In order that this interference fit can be formed, the stop ring 36 serves as an attachment ring of the compression body 38 in the toothed rack housing 32. Thus, the end stop damping assembly 30 includes two stop rings 34, 36, one of which serves as an attachment ring 36 for the end stop damping assembly 30 and the other, at least in the axial end stop of the rack-and-pinion steering 10, is contacted on the end face by the toothed rack 20 or an intermediate part 52 that is firmly connected with the toothed rack 20 (cf. FIG. 2). The damping section of the compression body 38 is arranged here between the two stop rings 34, 36.

The stop ring 36 which is configured as the attachment ring has an L-shaped cross-section, with one of the legs of the "L" extending in the radial direction and constituting a contact surface for the compression body 38. The other leg of the "L" is integrally formed radially on the outside, extends in the axial direction, and forms a radially outer cylindrical bushing section 56.

An axial attachment extension 54 for the stop ring 36 is integrally formed with the compression body 38, this attachment extension 54 surrounding the bushing section 56 on the outside. In relation to a diameter of the cylindrical housing opening 50, an outside diameter of the cylindrical bushing section 56 is here selected such that in the mounted position of the end stop damping assembly 30 (cf. FIG. 2), the attachment extension 54 is radially clamped between the toothed rack housing 32 and the bushing section 56, with the stop ring 36, which is, as a rule, made of metal, preferably steel, providing for the necessary contact pressure and the attachment extension 54 for a sufficient adhesive bond between the stop ring 36 and the toothed rack housing 32. Thus, a reliable attachment of the end stop damping assembly 30 to the toothed rack housing 32 is ensured.

FIG. 3 shows a section taken through the end stop damping assembly 30 before it is assembled. The attachment ring 36 and the elastic compression body 38 already form a structural unit since the compression body 38 is vulcanized to the stop ring 36 preferably directly during its manufacture. This offers the advantage that the compression body 38 can be manufactured and reliably and firmly connected with the stop ring 36 in just one production step, which greatly simplifies the manufacture of the end stop damping assembly 30.

In a variant embodiment, the stop ring 36 may also be vulcanized into the attachment extension 54, that is, completely or almost completely surrounded by the elastic material of the compression body 38.

According to FIGS. 2 to 4, the compression body 38 is a ring that is preferably made from an elastomer and has a substantially trapezoidal annular cross-section. This trapezoidal shape allows a damping or spring characteristic, in particular a progressive characteristic, of the end stop damping assembly 30 to be adjusted by simple means. Owing to the radial gap 42 and the comparatively axially short guide extension 40, the compression body 38 has sufficient space available for a deformation when taking up an axial load.

The trapezoidal annular cross-section of the compression body 38 is adjoined on the one hand by the axial attachment extension 54 already mentioned above, which surrounds the bushing section 56 on the outside. On the other hand, the trapezoidal annular cross-section is adjoined on the axially opposite side by a further axial attachment extension 58 for the stop ring 34. The attachment extension 58 is in the form of an elastic detent ring here which first widens radially when the stop ring 34 is introduced axially and snaps back to its initial position in a mounted position of the stop ring 34 (cf. FIG. 4). In this way, the stop ring 34 is attached to the elastic compression body 38 by means of a form-locking connection, preferably a detent connection.

The axial length $x_1$ of the compression body 38 and the axial length $x_2$ of the guide extension 40 on the stop ring 34 have been drawn into FIGS. 3 and 4, it being clearly apparent that the axial length $x_2$ of the guide extension 40 is smaller than the axial length $x_1$ of the trapezoidal spring/damping section of the compression body 38. This has the positive effect that the compression body 38 has greater freedom to deform, as compared to a complete encapsulation by the end stop damping assembly 30. This has a positive effect on the adjustment of a desired characteristic of the end stop damping assembly 30. This characteristic is decisively controlled by the specific dimensions of the trapezoidal cross-section of the compression body 38 and the axial length of the guide extension 40.

Preferably, the axial length $x_2$ of the guide extension 40 is selected such that it corresponds at the most to an axial length $x_1'$ (not drawn in) of the maximum compressed compression body 38. In this case, the guide extension 40 never overlaps the radially oriented L-leg of the stop ring 36. In the mounted condition of the end stop damping assembly 30, the L-leg can therefore extend radially inward so far as to allow the guide bushing 44 to be axially fixed in position in the toothed rack housing 32 (cf. FIG. 2).

The stop ring 34 very closely adjoins the toothed rack 20 on the inside and, as viewed in the circumferential direction of the toothed rack 20, may also at least partly be in sliding contact with the toothed rack 20. The guide extension 40 offers the advantage here that it provides a larger contact surface, as a result of which any tilting of the stop ring 34 is largely excluded.

The inside diameter of the stop ring 34 is, as a rule, slightly smaller than the inside diameter of the attachment ring 36 since a sliding contact between the stop ring 34 and the toothed rack 20 is to be allowed, whereas a contact between the attachment ring 36 and the toothed rack 20 is to be prevented. The L-leg of the attachment ring 36 is guided inwards just so far that it can reliably fix the guide bushing 44 in position in the axial direction, but does not come into contact with the toothed rack 20. The function of guiding the toothed rack 20 relative to the toothed rack housing 32 in this region is exclusively assumed by the guide bushing 44.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:
1. A rack-and-pinion steering, comprising
a toothed rack having a longitudinal axis,
a toothed rack housing in which the toothed rack is guided for axial displacement between two end stops, and
an end stop damping assembly for axially damping the displacement of the toothed rack at the end stops, which includes a plurality of stop rings, one of which serves as an attachment ring attaching the end stop damping assembly to the toothed rack housing and a further stop ring is contacted on the end face by the toothed rack or an intermediate part at least in the axial end stop, and at least one elastic compression body,
the compression body surrounding the toothed rack, and a spring/damping section of the compression body having an axial length in a non-loaded condition, at least one of the stop rings having a continuously surrounding axial guide extension which is located radially inside in relation to the compression body and has an axial length, wherein the axial length of the axial guide extension is smaller than the axial length of the spring/damping section of the compression body, wherein the spring/damping section of the compression body is axially arranged between two stop rings, and wherein at least one axial attachment extension for the at least one of the stop rings is formed on the compression body, wherein the stop rings are rigid;

wherein the at least one axial attachment extension rests against the outer surface of a radially outer cylindrical section of the at least one of the stop rings.

2. The rack-and-pinion steering according to claim 1, further comprising a guide bushing which serves to guide the displaceable toothed rack and is arranged in a recess of the toothed rack housing, and one of the stops ring axially fixing the guide bushing in position in the toothed rack housing.

3. The rack-and-pinion steering according to claim 2, wherein the recess of the toothed rack housing includes a shoulder at an end opposite to the at least one of the stop rings, the shoulder acting as an axial stop for the guide bushing.

4. The rack-and-pinion steering according to claim 1, wherein the end stop damping assembly is accommodated in a housing opening and is seated in the toothed rack housing with an interference fit.

5. The rack-and-pinion steering according to claim 1, wherein the compression body is a ring having a substantially trapezoidal annular cross-section.

6. The rack-and-pinion steering according to claim 1, wherein the at least one of the stop rings is attached to the elastic compression body by means of a form-locking connection.

7. The rack-and-pinion steering according to claim 1, wherein the elastic compression body is vulcanized to the at least one of the stop rings.

8. The rack-and-pinion steering according to claim 1, wherein a surrounding radial gap is provided between the two stop rings in the axial direction and between the compression body and the toothed rack in the radial direction, the axial guide extension extending into the radial gap.

9. The rack-and-pinion steering according to claim 1, wherein the at least one axial attachment extension is radially clamped between the toothed rack housing and the radially outer cylindrical bushing section.

10. The rack-and-pinion steering according to claim 1, wherein a surrounding radial gap is provided between the compression body and the toothed rack.

11. A rack-and-pinion steering, comprising a toothed rack having a longitudinal axis, a toothed rack housing in which the toothed rack is guided for axial displacement between two end stops, and an end stop damping assembly for axially damping the displacement of the toothed rack at the end stops, which includes a plurality of stop rings, one of which serves as an attachment ring securing the end stop damping assembly to the toothed rack housing and a further stop ring is contacted on the end face by the toothed rack or an intermediate part at least in the axial end stop, and at least one elastic compression body, the compression body surrounding the toothed rack, and a spring/damping section of the compression body having an axial length in a non-loaded condition, at least one of the stop rings having a continuously surrounding axial guide extension which is located radially inside in relation to the compression body and has an axial length, wherein the axial length of the axial guide extension is smaller than the axial length of the spring/damping section of the compression body, wherein the spring/damping section of the compression body is axially arranged between two stop rings, wherein at least one axial attachment extension for the at least one of the stop rings is formed on the compression body;

wherein both stop rings are secured to the compression body; and wherein the stop rings and the compression body are mounted inside the toothed rack housing.

* * * * *